United States Patent
Suzuki et al.

(10) Patent No.: US 10,075,887 B2
(45) Date of Patent: Sep. 11, 2018

(54) TERMINAL DEVICE, INTEGRATED CIRCUIT, AND COMMUNICATION METHOD

(71) Applicant: Sharp Kabushiki Kaisha, Sakai, Osaka (JP)

(72) Inventors: Shoichi Suzuki, Sakai (JP); Tatsushi Aiba, Sakai (JP); Katsunari Uemura, Sakai (JP); Kazunari Yokomakura, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/500,983

(22) PCT Filed: Aug. 4, 2015

(86) PCT No.: PCT/JP2015/072056
§ 371 (c)(1),
(2) Date: Feb. 1, 2017

(87) PCT Pub. No.: WO2016/021585
PCT Pub. Date: Feb. 11, 2016

(65) Prior Publication Data
US 2017/0230876 A1     Aug. 10, 2017

(30) Foreign Application Priority Data
Aug. 5, 2014   (JP) ................. 2014-159392

(51) Int. Cl.
*H04M 11/00*   (2006.01)
*H04W 36/08*   (2009.01)
(Continued)

(52) U.S. Cl.
CPC ............ *H04W 36/08* (2013.01); *H04W 4/70* (2018.02); *H04W 36/00* (2013.01);
(Continued)

(58) Field of Classification Search
None
See application file for complete search history.

(56) References Cited

U.S. PATENT DOCUMENTS

2009/0215459 A1* 8/2009 Kuo .................... H04W 74/002
                                                    455/436
2014/0133465 A1* 5/2014 Johansson ............ H04W 24/04
                                                    370/332
(Continued)

OTHER PUBLICATIONS

Official Communication issued in International Patent Application No. PCT/JP2015/072056, dated Oct. 13, 2015.
(Continued)

*Primary Examiner* — Shantell L Heiber
(74) *Attorney, Agent, or Firm* — Keating & Bennett, LLP

(57) ABSTRACT

A terminal device that communicates with a different terminal device and an Evolved Universal Terrestiral Radio Access Network (EUTRAN) configures a mode 2 that is available for communication between terminal devices out of EUTRAN coverage and for communication between terminal devices in the EUTRAN coverage, as a mode for inter-terminal device communication, and, during a handover procedure, performs reception processing for communication between terminal devices in a mode 2.

2 Claims, 8 Drawing Sheets

(51) Int. Cl.
*H04W 92/18* (2009.01)
*H04W 72/04* (2009.01)
*H04W 36/00* (2009.01)
*H04W 4/70* (2018.01)
*H04W 76/14* (2018.01)
*H04W 76/10* (2018.01)
*H04W 72/12* (2009.01)

(52) U.S. Cl.
CPC ....... *H04W 72/0406* (2013.01); *H04W 76/10* (2018.02); *H04W 76/14* (2018.02); *H04W 92/18* (2013.01); *H04W 72/0473* (2013.01); *H04W 72/12* (2013.01)

(56) References Cited

U.S. PATENT DOCUMENTS

2014/0171085 A1* 6/2014 Li .................... H04W 36/0061
455/436
2015/0045028 A1* 2/2015 Singh ............... H04W 36/0094
455/436
2015/0271859 A1* 9/2015 Huang ................ H04W 72/12
370/329

OTHER PUBLICATIONS

Ericsson et al., "D2D for LTE Proximity Services: Overview", 3GPP TSG-RAN WG1 #73, R1-132028, May 20-24, 2013, pp. 1-6.
U.S. Department of Commerce, "Public safety perspective on resource allocation for D2D group communications", 3GPP TSG-RAN WG1 #76, R1-140427, Feb. 10-14, 2014, 3 pages.
Ericsson, "Frame Structure for D2D-Enabled LTE Carriers", 3GPP TSG RAN WG1 #76, R1-140775, Feb. 10-14, 2014, 3 pages.
Samsung, "Definitions of in-coverage, out-of-coverage, edge-of-cell coverage", 3GPP TSG RAN WG1 #77, R1-142114, May 19-23, 2014, pp. 1-4.
"LTE; Evolved Universal Terrestrial Radio Access (E-UTRA); Radio Resource Control (RRC); Protocol specification (3GPP TS 36.331 version 11.7.0 Release 11)", ETSI TS 136 331 V11.7.0, Mar. 2014, 354 pages.

* cited by examiner

TERMINAL DEVICE, INTEGRATED CIRCUIT, AND COMMUNICATION METHOD

TECHNICAL FIELD

The present invention relates to a terminal device, an integrated circuit, and a communication method.

This application claims the benefit of Japanese Patent Application No. 2014-159392 filed on Aug. 5, 2014, the entire contents of which are incorporated herein by reference.

BACKGROUND ART

In the 3rd Generation Partnership Project (3GPP), a radio access scheme (Evolved Universal Terrestrial Radio Access (EUTRA)) and a radio access network (Evolved Universal Terrestrial Radio Access Network (EUTRAN)) for cellular mobile communication have been considered. The EUTRA and the EUTRAN are also referred to as Long Term Evolution (LTE). In LTE, a base station apparatus is also referred to as an evolved NodeB (eNodeB) and a terminal device is also referred to as a User Equipment (UE). LTE is a cellular communication system in which an area is divided in a cellular pattern into multiple cells, each being served by a base station apparatus. A single base station apparatus may manage multiple cells.

In 3GPP, Proximity based Services (ProSe) have been considered. ProSe includes ProSe discovery and ProSe communication. The ProSe discovery is a process which specifies that a terminal device is brought in proximity to a different terminal device using the EUTRA. The ProSe communication is communication between two terminal devices that are brought in proximity to each other using a EUTRAN communication path that is established between the two terminals. For example, the communication path may be established directly between the terminal devices.

The ProSe discovery and the ProSe communication are also referred to as Device to Device (D2D) discovery and D2D communication, respectively. The ProSe discovery and the ProSe communication are also collectively referred to as ProSe. The D2D discovery and the D2D communication are also collectively referred to as D2D. The communication path is also referred to as a link.

In NPL 1, it is disclosed that a subset of resource blocks are reserved for the D2D, that a network configures a set of D2D resources, and that the terminal device is allowed to transmit a D2D signal using the configured resources.

CITATION LIST

Non Patent Document

[NON PATENT DOCUMENT 1] NPL 1: "D2D for LTE Proximity Services: Overview", R1-132028, 3GPP TSG-RAN WG1 Meeting #73, 20-24 May 2013

DISCLOSURE OF THE INVENTION

Problems to be Solved by the Invention

However, it has not been sufficiently considered that the terminal device performs the D2D and cellular communication at the same time. According to the present inventions, there are provided a terminal device that is capable of efficiently performing D2D, an integrated circuit that is built into the terminal device, and a communication method that is used in the terminal device.

Means for Solving the Problems (1) According to a first aspect of the present invention, there is provided a terminal device configured to perform handover from a source cell to a target cell, the terminal device including: a reception unit configured to receive first information indicating a frequency of the target cell in the source cell and to receive system information relating to first communication in the target cell, and a transmission unit configured to perform transmission of the first communication, using a resource that is included in a resource pool which is indicated by the system information that is received in the target cell, in a case where the handover from the source cell to the target cell fails, in which the first communication is a mode of communication in which the terminal device and a different terminal device communicate directly with each other.

(2) According to a second aspect of the present invention, there is provided an integrated circuit that is built into a terminal device that is configured to perform handover from a source cell to a target cell, the integrated circuit causing the terminal device to perform a sequence of functions including: a function of receiving first information indicating a frequency of the target cell in the source cell; a function of receiving system information relating to first communication in the target cell; and a function of performing transmission of the first communication, using a resource that is included in a resource pool which is indicated by the system information that is received in the target cell, in a case where the handover from the source cell to the target cell fails, in which the first communication is a mode of communication in which the terminal device and a different terminal device communicate directly with each other.

(3) According to a third aspect of the present invention, there is provided a communication method that is used in a terminal device which is configured to perform handover from a source cell that corresponds to a source base station to a target cell that corresponds to a target base station apparatus, the communication method including: receiving first information indicating a frequency of the target cell, which is generated by the target base station apparatus and is transferred by the source base station apparatus; receiving system information relating to first communication in the target cell; and performing transmission of the first communication, using a resource that is included in a resource pool which is indicated by the system information that is received from the target cell, in a case where the handover from the source cell to the target cell fails, in which the first communication is a mode of communication in which the terminal device and a different terminal device communicate directly with each other.

Effects of the Invention

According to the invention, a terminal device is capable of efficiently performing D2D.

MODE FOR CARRYING OUT THE INVENTION

Embodiments of the present invention will be described below.

According to the present embodiment, one or multiple cells are configured for a terminal device. A technology in which the terminal device performs communication through multiple cells is referred to as cell aggregation or carrier aggregation. The present invention may apply to each of the multiple cells that are configured for the terminal device. Furthermore, the present invention may apply to some of the multiple cells that are configured. A cell that is configured for the terminal device is referred to as a serving cell. The serving cell is used for communication for a EUTRAN. A cell that is configured for D2D is referred to as a D2D cell. The D2D cell may be the serving cell. Furthermore, the D2D cell may be a cell other than the serving cell.

Multiple serving cells that are configured include one primary cell, or one or multiple secondary cells. A primary cell is a serving cell in which an initial connection establishment procedure is executed, a serving cell in which a connection re-establishment procedure is initiated, or a cell that is designated as a primary cell during a handover procedure. At a point in time at which a Radio Resource Control (RRC) connection is established, or later, the secondary cell may be configured.

In the case of the cell aggregation, a Time Division Duplex (TDD) scheme or a Frequency Division Duplex (FDD) scheme may apply to all multiple cells. Furthermore, a cell to which the TDD scheme applies and a cell to which the FDD scheme applies may be aggregated.

Figure 1:
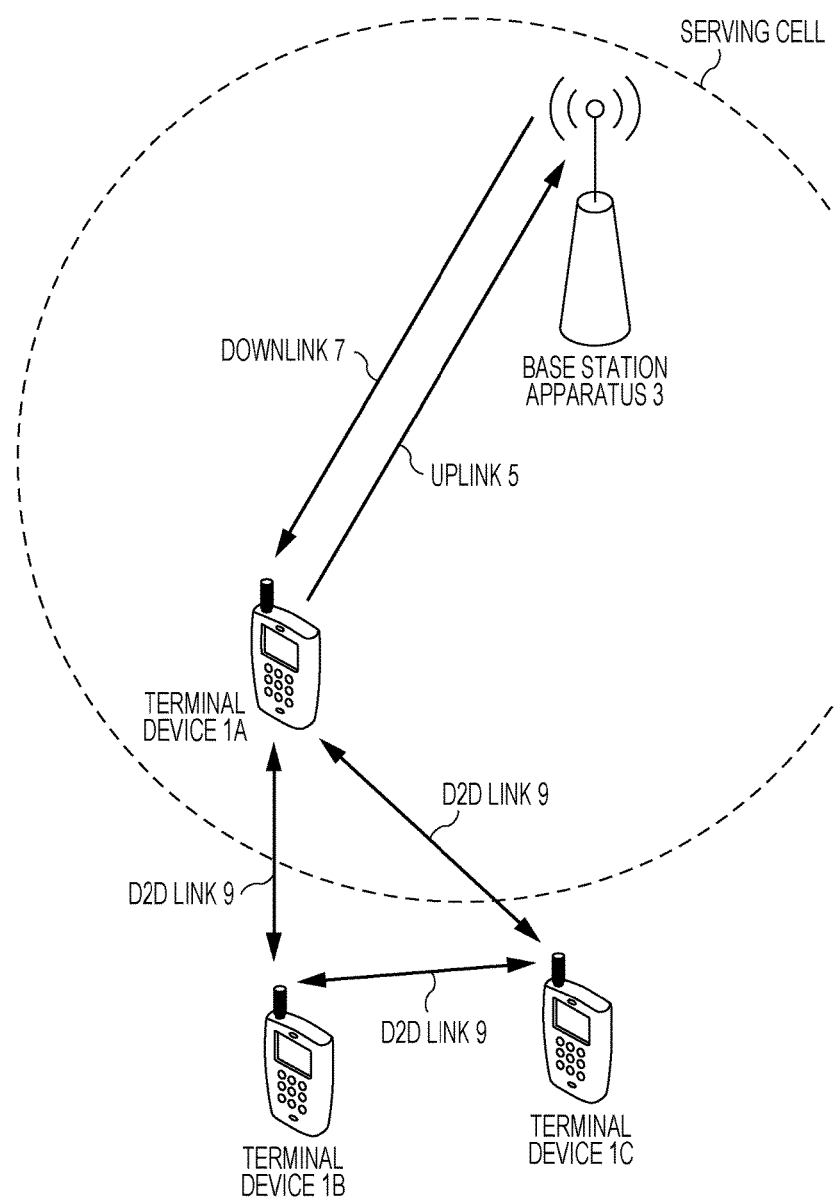
FIG. 1 is a conceptual diagram of a wireless communication system according to the present embodiment.

FIG. 1 is a conceptual diagram of a wireless communication system according to the present embodiment. In FIG. 1, the wireless communication system includes terminal devices 1A to 1C and a base station apparatus 3. The terminal devices 1A to 1C are referred to as a terminal device 1. A serving cell 4 indicates an area (coverage) that is covered by the base station apparatus 3 (LTE or the EUTRAN). The terminal device 1A is in EUTRAN coverage. The terminal device 1B and the terminal device 1C are out of the EUTRAN coverage. The terminal devices 1 in the EUTRAN coverage may include the terminal device 1 that establishes a link to the EUTRAN. The terminal devices 1 out of the EUTRAN coverage may include the terminal device 1 that does not establish the link to the EUTRAN, and/or the terminal device 1 in a RRC_IDLE state.

An uplink 5 is a link from the terminal device 1 to the base station apparatus 3. A downlink 7 is a link from the base station apparatus 3 to the terminal device 1. Furthermore, the uplink 5 and the downlink 7 are also referred to as a cellular link or a cellular communication path. Furthermore, communication between the terminal device 1 and the base station apparatus 3 is also referred to cellular communication or communication with the EUTRAN.

A D2D link 9 is a link between the terminal devices 1. Moreover, the D2D link 9 is also referred to as a D2D communication path, a ProSe link, or a ProSe communication path. D2D discovery and D2D communication are performed over the D2D link 9. The D2D discovery is a process/procedure which identifies that the terminal device 1 is brought in proximity to a different terminal device 1 using a EUTRA. The D2D communication is communication between multiple terminal devices 1 that are brought in proximity to one another using a EUTRAN communication path that is established between the multiple terminal devices 1. For example, the communication path may be established directly between the terminal devices 1.

A physical channel and a physical signal according to the present embodiment are described.

A downlink physical channel and a downlink physical signal are collectively referred to as a downlink signal. An uplink physical channel and an uplink physical signal are collectively referred to as an uplink signal. A D2D physical channel and a D2D physical signal are collectively referred to as a D2D signal. The physical channel is used for transmitting information that is output from a higher layer. The physical signal is not used for transmitting the information that is output from the higher layer, but is used by a physical layer.

In FIG. 1, the following D2D physical channels are used for wireless communication over the D2D link 9 between the terminal devices 1.

Physical Device to Device Synchronization Channel (PD2DSCH)

Physical Device to Device Data Channel (PD2DDCH)

The PD2DSCH is used for information relating to synchronization. For example, the information relating to the synchronization includes a D2D frame number or a System Frame Number (SFN).

The PD2DDCH is used for transmitting D2D data (a Prose communication Shared Channel (PSCH)) and Device to Device Scheduling Assignment (D2DSA). The D2D data and the D2DSA are not mapped to the same PD2DSCH. The D2DSA is used for scheduling of the PD2DSCH that is used for transmission of the D2D data. The D2DSA includes information indicating a resource for the PD2DSCH that is used for the transmission of the D2D data, information indicating a destination identifier (a destination identity), information indicating a source identifier (a source identity), and the like. The D2D data and the D2DSA that correspond to the D2D discovery are referred to as a discovery signal. The D2D data and the D2DSA that correspond to the D2D communication are referred to as a communication signal.

The PD2DSCH may be a Physical Uplink Shared Channel (PUSCH). That is, the PUSCH may be used for transmission of the D2D data and the D2DSA. According to the present embodiment, the PUSCH that is used for the D2D is referred to as the PD2DSCH. According to the present embodiment, the PUSCH that is used for the communication with the EUTRAN is simply expressed as the PUSCH. The PUSCH will be described in detail below.

In FIG. 1, the following D2D physical signals are used for D2D wireless communication.

D2D Synchronization Signal (D2DSS)

D2D Reference Signal (D2DRS)

The D2DSS is used for being synchronized in a D2D link. The D2DSS includes a Primary D2D Synchronization Signal (PD2DSS) and a Secondary D2D synchronization Signal (SD2DSS). The D2DSS is associated with transmission of the PD2DSCH. The D2DSS may be time-multiplexed with the PD2DSCH. The terminal device 1 may use the D2DSS in order to perform channel reconfiguration of the PD2DSCH.

The D2DRS is associated with transmission of the PD2DSCH or the PD2DDCH. The D2DRS may be time-multiplexed with the PUSCH or PUCCH. The terminal device 1 may use the D2DRS in order to perform the channel reconfiguration of the PD2DSCH.

From the perspective of the terminal device 1 that performs transmission, the terminal device 1 can operate in two modes (a mode 1 and a mode 2) for allocation of a resource to the D2D communication.

In the mode 1, the EUTRAN (the base station apparatus 3) schedules a correct resource that is used by the terminal device 1 for transmission of the communication signal (the D2D data and the D2DSA).

In the mode 2, the terminal device 1 selects a resource from a resource pool for the transmission of the communication signal (the D2D data and the D2DSA). The resource pool is a set of resources. A resource pool for the mode 2 may be configured/limited semi-statically by the EUTRAN (the base station apparatus 3). Furthermore, the resource pool for the mode 2 may be pre-configured.

The terminal device 1 that has the capability of the D2D communication, which is in the EUTRAN coverage, may support the mode 1 and the mode 2. The terminal device 1 that has the capability of the D2D communication, which is out of the EUTRAN coverage, may support only the mode 2. A configuration (for example, the resource pool for the mode 2) that is pre-configured is used by the terminal device 1 out of the EUTRAN coverage. According to the present embodiment, a configuration other than the configuration that is pre-configured is used by the terminal device 1 in the EUTRAN coverage. Furthermore, according to the present embodiment, the configuration other than the configuration that is pre-configured is effective only in a cell group.

Two types (a type 1 and a type 2) are defined as D2D discovery procedures.

The type 1 of D2D discovery procedure is a D2D discovery procedure in which a resource for the discovery signal is not dedicatedly allocated to the terminal device 1. That is, in the type 1 of D2D discovery procedure, the resource for the discovery signal may be allocated to all terminal devices 1 or a group of terminal devices 1.

The type 2 of D2D discovery procedure is a D2D discovery procedure in which the resource for the discovery signal is dedicatedly allocated to the terminal device 1. The discovery procedure in which a resource is allocated to each of the transmission instances dedicated to the discovery signal is referred to as a type 2A discovery procedure. The type 2 of discovery procedure in which a resource is allocated semi-persistently for the transmission of the discovery signal is referred to as a type 2B discovery procedure.

In FIG. 1, the following uplink physical channels are used for uplink wireless communication.

Physical Uplink Control Channel (PUCCH)
Physical Uplink Shared Channel (PUSCH)
Physical Random Access Channel (PRACH)

The PUCCH is a physical channel that is used for transmitting Uplink Control Information (UCI).

The PUSCH is a physical channel that is used for transmitting uplink data (Uplink-Shared Channel (UL-SCH)) and/or a HARQ-ACK and/or channel state information.

The PRACH is a physical channel that is used for transmitting a random access preamble. The PRACH is used for the initial connection establishment procedure, the handover procedure, and the connection re-establishment procedure.

In FIG. 1, the following uplink physical signal is used for the uplink wireless communication.

Uplink Reference Signal (UL RS)

According to the present embodiment, the following two types of uplink reference signals are used.

Demodulation Reference Signal (DMRS)
Sounding Reference Signal (SRS)

The DMRS is associated with transmission of the PUSCH or the PUCCH. The DMRS is time-multiplexed with the PUSCH or the PUCCH. The base station apparatus 3 uses the DMRS in order to perform the channel reconfiguration of the PUSCH or the PUCCH. The SRS is not associated with the transmission of the PUSCH or the PUCCH. The base station apparatus 3 uses the SRS in order to measure an uplink channel state.

In FIG. 1, the following downlink physical channels are used for downlink wireless communication.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB) (Broadcast Channel (BCH)) that is used in a shared manner in the terminal device 1. For example, the MIB includes information indicating the SFN. The system frame number (SFN) is a radio frame number. The MIB is system information.

The PCFICH is used for transmitting information that indicates a region (an OFDM symbol) which is used for transmission of the PDCCH.

The PHICH is used for transmitting a HARQ indicator indicating an ACKnowledgement (ACK) of or a Negative ACKnowledgement (NACK) of the uplink data (the Uplink Shared Channel (UL-SCH)) that is received by the base station apparatus 3.

The PDCCH and the EPDCCH are used for transmitting Downlink Control Information (DCI). The Downlink Control Information is also referred to as a DCI format. The Downlink Control Information includes a downlink grant, an uplink grant, and a D2D grant. The downlink grant is also referred to as downlink assignment or downlink allocation.

The uplink grant is used for scheduling of a single PUSCH within a single cell. The uplink grant is used for the scheduling of a single PUSCH within a certain subframe. The downlink grant is used for the scheduling of a single PDSCH within a single cell. The downlink grant is used for the scheduling of the PDSCH within a subframe that is the same as the subframe in which the downlink grant is transmitted. The D2D grant is used for scheduling of the PD2DDCH that is associated with the mode 1 for the D2D communication.

A Cyclic Redundancy Check (CRC) parity bit is attached to the DCI format. The CRC parity bit is scrambled with a Cell-Radio Network Temporary Identifier (C-RNTI), a Semi Persistent Scheduling Cell-Radio Network Temporary Identifier (SPS C-RNTI), or a D2D-Radio Network Temporary Identifier (D2D-RNTI). The C-RNTI, the SPS C-RNTI, and the D2D-RNTI are identifiers for identifying the terminal device 1 within a cell. The C-RNTI is used for controlling a resource for the PDSCH or a resource for the PUSCH within a single subframe. The SPSC-RNTI is used for periodically allocating a resource for the PDSCH or the PUSCH. The D2D-RNTI is used for transmission of the D2D grant. That is, the D2D-RNTI is used for the scheduling of the PD2DSCH for the D2D communication in the mode 1.

The PDSCH is used for transmitting downlink data (Downlink Shared Channel (DL-SCH)).

The PMCH is used for transmitting multicast data (Multicast Channel (MCH)).

In FIG. 1, the following downlink physical signals are used for the downlink wireless communication.

Synchronization signal (SS)
Downlink Reference Signal (DL RS)

The synchronization signal is used in order for the terminal device 1 to be synchronized to a frequency domain and a time domain for downlink. In the FDD scheme, the synchronization signal is mapped to subframes 0 and 5 within a radio frame.

The downlink reference signal is used in order for the terminal device 1 to perform the channel reconfiguration of the downlink physical channel. The downlink reference signal is used in order for the terminal device 1 to calculate downlink channel state information. The downlink reference signal is used in order for the terminal device 1 to measure a geographical location of the terminal device 1 itself.

According to the present embodiment, the following five types of downlink reference signals are used.

Cell-specific Reference Signal (CRS)
UE-specific Reference Signal (URS) that is associated with the PDSCH
Demodulation Reference Signal (DMRS) that is associated with the EPDCCH
Non-Zero Power Chanel State Information-Reference Signal (NZP CSI-RS)
Zero Power Chanel State Information-Reference Signal (ZP CSI-RS)
Multimedia Broadcast and Multicast Service over Single Frequency Network Reference signal (MBSFN RS)

The CRS is transmitted in an entire band for a subframe. The CRS is used for performing demodulation of the PBCH/PDCCH/PHICH/PCFICH/PDSCH. The CRS may be used in order for the terminal device 1 to calculate the downlink channel state information. The PBCH/PDCCH/PHICH/PCFICH is transmitted on an antenna port that is used for the transmission of the CRS.

The URS that is associated with the PDSCH is transmitted in a subframe and a band that are used for transmission of the PDSCH with which the URS is associated. The URS is used for performing the demodulation of the PDSCH with which the URS is associated. The PDSCH is transmitted on an antenna port that is used for the transmission of the CRS or on antenna port that is used for transmission of the URS.

The DMRS that is associated with the EPDCCH is transmitted in a subframe and a band that are used for transmission of the EPDCCH with which the DMRS is associated. The DMRS is used for performing demodulation of the EPDCCH with which the DMRS is associated. The EPDCCH is transmitted on an antenna port that is used for transmission of the DMRS.

The NZP CSI-RS is transmitted in a subframe that is configured. A resource on which the NZP CSI-RS is transmitted is configured by the base station apparatus 3. The NZP CSI-RS is used in order for the terminal device 1 to calculate the downlink channel state information. The terminal device 1 performs signal measurement (channel measurement) using the NZP CSI-RS.

A resource for the ZP CSI-RS is configured by the base station apparatus 3. With a zero output, the base station apparatus 3 transmits the ZP CSI-RS. More precisely, the base station apparatus 3 does not transmit the ZP CSI-RS. The base station apparatus 3 does not transmit the PDSCH and the EPDCCH on a resource that is configured for the ZP CSI-RS. For example, in a certain cell, the terminal device 1 can measure interference in a resource to which the NZP CSI-RS corresponds.

The MBSFN RS is transmitted in an entire band for a subframe that is used for transmission of the PMCH. The MBSFN RS is used for performing demodulation of the PMCH. The PMCH is transmitted on an antenna port that is used for transmission of the MBSFN RS.

The PSCH, the BCH, the MCH, the UL-SCH, and the DL-SCH are transport channels. A channel that is used in a Medium Access Control (MAC) layer is referred to as a transport channel. A unit of data for the transport channel that is used in the MAC layer is also referred to as a transport block (TB) or a MAC Protocol Data Unit (PDU). Control of a Hybrid Automatic Repeat reQuest (HARQ) is performed for every transport block in the MAC layer. The transport block is a unit of data that the MAC layer delivers to the physical layer. In the physical layer, the transport block is mapped to a codeword, and coding processing is performed on every codeword.

A structure of the radio frame according to the present embodiment is described.

In LTE, two structures of the radio frame are supported. The two structures of the radio frame are a frame structure type 1 and a frame structure type 2. The frame structure type 1 is applicable to FDD. The frame structure type 2 is applicable to TDD.

Figure 2:
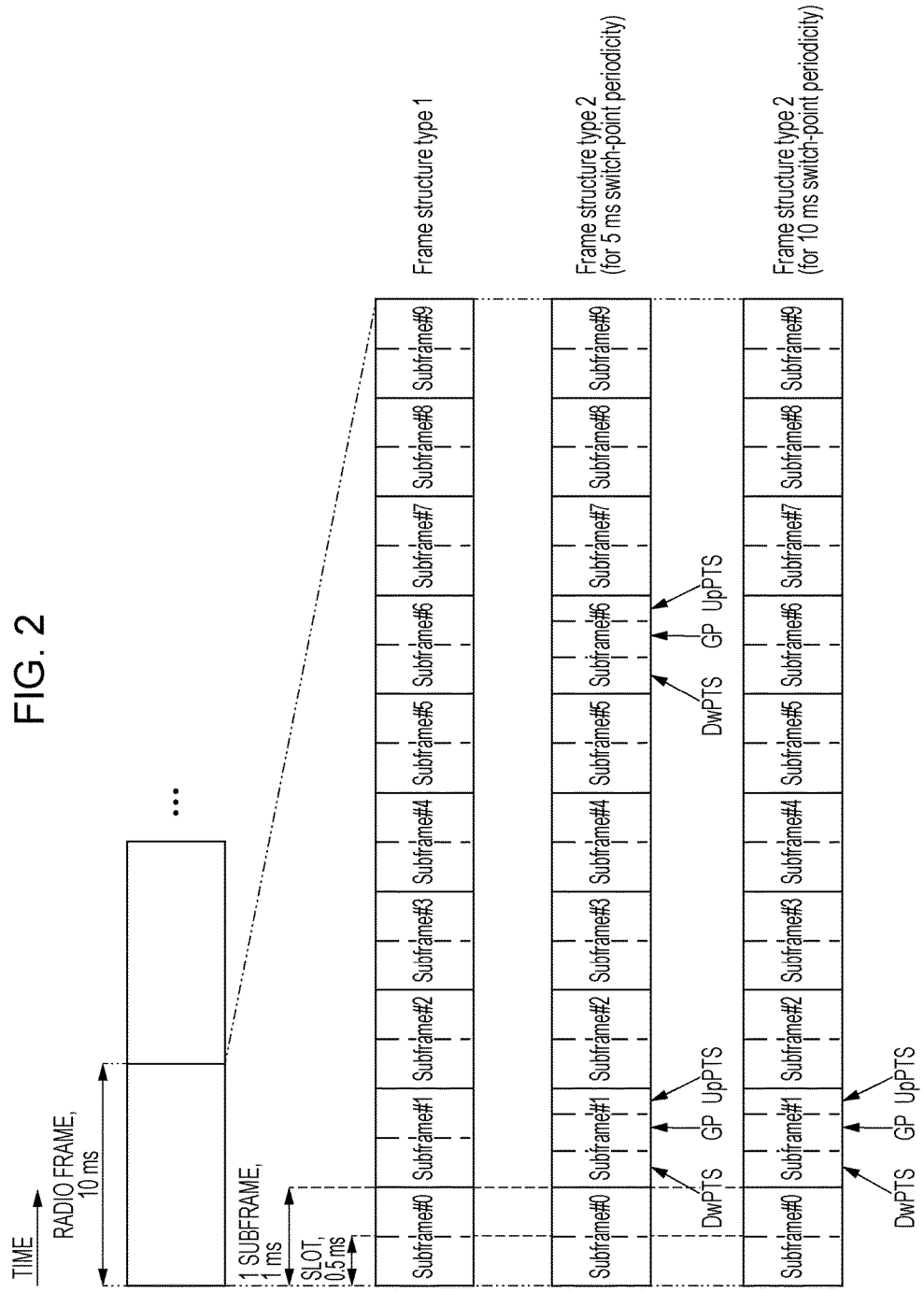
FIG. 2 is a diagram of a schematic constitution of a radio frame according to the present embodiment.

FIG. 2 is a diagram illustrating a schematic constitution of the radio frame according to the present embodiment. In FIG. 2, the horizontal axis is a time axis. Furthermore, each of a type 1 radio frame and a type 2 radio frame is 10 ms long, and is defined by 10 subframes. Each of the subframes is 1 ms long, and is defined by two consecutive slots. Each of the lots is 0.5 ms long. An i-th subframe within the radio frame is constituted from a (2×i)-th slot and a (2×i+1)-th slot.

The following three types of subframes are defined for frame structure type 2.

Downlink Subframe
Uplink Subframe
Special Subframe

The downlink subframe is a subframe that is reserved for downlink transmission. The uplink subframe is a subframe that is reserved for uplink transmission. The special subframe is constituted from three fields. The three fields are a Downlink Pilot Time Slot (DwPTS), a Guard Period (GP), and an Uplink Pilot Time Slot (UpPTS). A sum of lengths of the DwPTS, the GP, and the UpPTS is 1 ms long. The DwPTS is a field that is reserved for the downlink transmission. The UpPTS is a field that is reserved for the uplink transmission. The GP is a field on which the downlink transmission and the uplink transmission are not performed. Moreover, the special subframe may be constituted only from the DwPTS and the GP, and may be constituted only from the GP and the UpPTS.

A radio frame of frame structure type 2 is constituted at least from the downlink subframe, the uplink subframe, and the special subframe.

A constitution of the slot according to the present embodiment is described.

Figure 3:
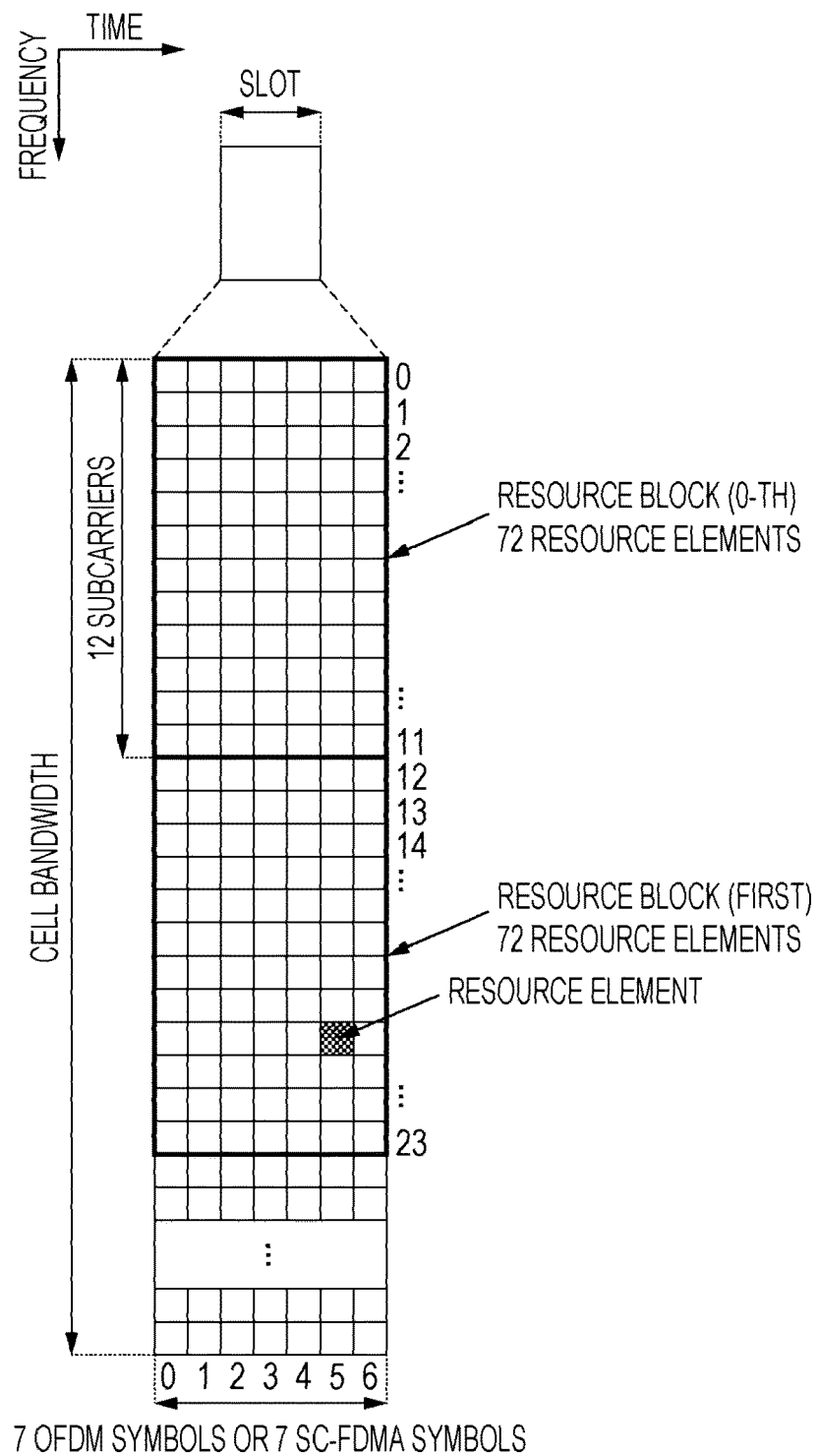
FIG. 3 is a diagram illustrating a constitution of a slot according to the present embodiment.

FIG. 3 is a diagram illustrating the constitution of the slot according to the present embodiment. In FIG. 3, a normal Cyclic Prefix (CP) applies to the OFDM symbol or an SC-FDMA symbol. The physical signal or the physical channel that is transmitted on each of the slots is expressed by a resource grid. In FIG. 3, the horizontal axis is a time axis and the vertical axis is a frequency axis. In a downlink, the resource grid is defined by multiple subcarriers and multiple OFDM symbols. In an uplink, the resource grid is defined by multiple subcarriers and multiple SC-FDMA symbols. For example, in the D2D link, the resource grid may be defined by multiple subcarriers and multiple SC-FDMA symbols. The number of subcarriers that constitute one slot depends on a cell bandwidth. The number of OFDM symbols or SC-FDMA symbols that constitute one slot is 7. Each of the elements within the resource grid is referred to as a resource element. The resource element is identified using a subcarrier number, and an OFDM symbol or SC-FDMA symbol number.

A resource block is used for expressing mapping of a certain physical channel (the PDSCH, the PUSCH, or the like) to resource elements. The resource block is defined by a virtual resource block and a physical resource block. A certain physical channel is first mapped to the virtual resource block. Thereafter, the virtual resource block is mapped to the physical resource block. One physical resource block is defined by 7 consecutive OFDM symbols or SC-FDMA symbols in the time domain and by 12 consecutive subcarriers in the frequency domain. Therefore, one physical resource block is constituted from (7×12) resource elements. Furthermore, one physical resource block corresponds to one slot in the time domain, and corresponds to 180 kHz in the frequency domain. The physical resource blocks are numbered from 0 in the frequency domain.

Moreover, an extended CP may apply to the OFDM symbol or the SC-FDMA symbol. In the case of the extended CP, the number of OFDM symbols or SC-FDMA symbols that constitute one slot is 7.

An arrangement of the physical channel and the physical signal according to the present embodiment is described.

Figure 4:
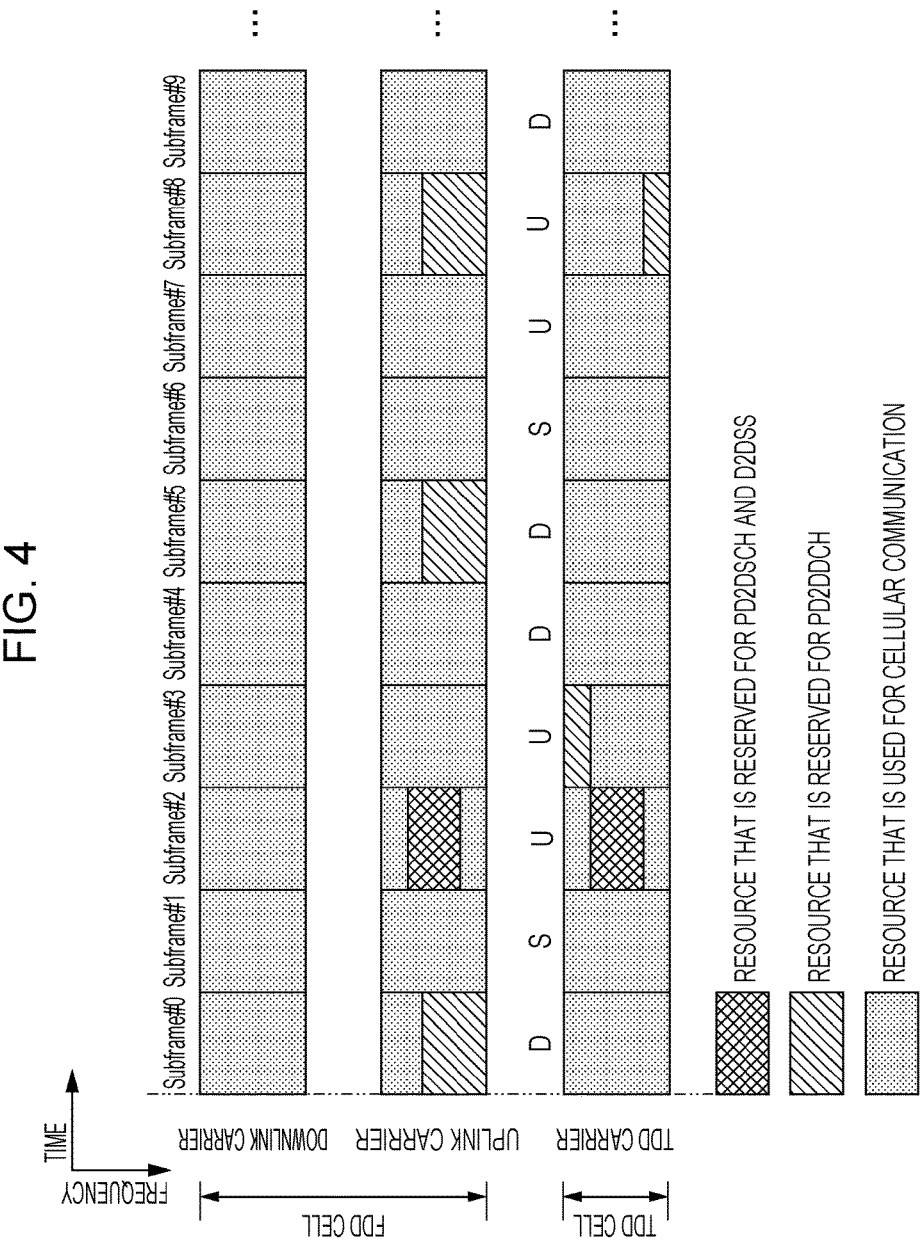
FIG. 4 is a diagram illustrating a D2D resource according to the present embodiment.

FIG. 4 is a diagram illustrating a D2D resource according to the present embodiment. A resource that is reserved for the D2D is referred to as the D2D resource. In FIG. 4, the horizontal axis is a time axis and the vertical axis is a frequency axis. In FIG. 4, D indicates a downlink subframe, S indicates a special subframe, and U indicates an uplink subframe. One FDD cell corresponds to one downlink carrier and one uplink carrier. One TDD cell corresponds to one TDD carrier.

In an FDD cell, the downlink signal that is used for the cellular communication is mapped to a subframe on a downlink carrier, the uplink signal that is used for the cellular communication is mapped to a subframe on an uplink carrier, and the D2D signal that is used for the D2D is mapped to a subframe on an uplink carrier. A carrier that corresponds to a cell in the downlink is referred to as a downlink component carrier. Furthermore, a carrier that corresponds to a cell in the uplink is referred to as an uplink component career. A TDD carrier is a downlink component carrier and is an uplink component carrier.

In a TDD cell, the downlink signal that is used for the cellular communication is mapped to the downlink subframe and the DwPTS, the uplink signal that is used for the cellular communication is mapped to the uplink subframe and the UpPTS, and the D2D signal that is used for the D2D is mapped to the uplink subframe and the UpPTS.

The base station apparatus 3 controls the D2D resource that is reserved for the D2D. The base station apparatus 3 reserves some of the resources on the uplink carrier in the FDD cell, as the D2D resource. The base station apparatus 3 reserves some of the resources in the uplink subframe and the UpPTS in the TDD cell, as the D2D resource.

The base station apparatus 3 may transmit a higher layer signal that includes information indicating a set (a pool) of D2D resources that are reserved in each of the cells, to the terminal device 1. The terminal device 1 sets a parameter, D2D-ResourceConfig, which indicates the D2D resource that is reserved for each of the cells, based on the higher layer signal that is received from the base station apparatus 3. That is, the base station apparatus 3 sets the parameter, D2D-ResourceConfig, which indicates the D2D resource that is reserved for each of the cells, for the terminal device 1 through the higher layer signal.

The PD2DSCH and the D2DSS may be transmitted using 62 subcarriers in the vicinity of a center frequency of the uplink component carrier.

The base station apparatus 3 may set one or multiple parameters indicating one or multiple sets of resources that are reserved for the D2D, for the terminal device 1 through the higher layer signal.

A set of resources for the PD2DSCH and the D2DSS and a set of resources that are reserved for the PD2DDCH may be dedicatedly controlled.

A set of resources for each of the type 1 of D2D discovery, the type 2 of D2D discovery, the mode 1 for the D2D communication, and the mode 2 for the D2D communication may be dedicatedly configured.

A set of resources for D2D transmission and reception may be dedicatedly configured.

Additionally, a set of resources for the PD2DDCH relating to the transmission of the D2D data, and a set of resources for the PD2DDCH relating to the transmission of the D2DSA may be dedicatedly configured.

From the perspective of the terminal device 1, among the sets of resources, which are described above, one or several sets of resources may be transparent. For example, because the PD2DDCH for the D2D data for the D2D communication is scheduled by the D2DSA, the terminal device 1 may not configure a set of resources for reception/monitoring of the PD2DDCH relating to the D2D data for the D2D communication.

In 3GPP, it has been considered that the D2D is used for Public Safety (PS). The base station apparatus 3 may notify the terminal device 1 whether or not each of the sets of D2D resources is a set of resources for the PS. Furthermore, for the terminal device 1, the D2D for the PS may be authenticated through the EUTRAN. That is, the terminal device 1 for which the D2D for the PS is not authenticated has difficulty in performing the D2D with the set of resources for the PS.

Moreover, the D2D communication and the D2D discovery may be dedicatedly authenticated. Furthermore, each of the type 1 of D2D discovery, the type 2 of D2D discovery, the mode 1 for the D2D communication, and the mode 2 for the D2D communication may be dedicatedly authenticated.

According to the present embodiment, the terminal device 1 for which the D2D communication is authenticated is hereinafter expressed simply as the terminal device 1.

A method of configuring a CP length according to the present embodiment is described.

The base station apparatus 3 controls CP lengths in the uplink and the downlink. The base station apparatus 3 may dedicatedly control the CP lengths in the uplink and downlink for every serving cell.

Based on the synchronization signal and/or the PBCH for a serving cell, the terminal device 1 detects a CP length of the downlink signal for the serving cell, with the exception of the PMCH and the MBSFN RS. The extended CP applies at all times to the PMCH and the MBSFN RS.

The base station apparatus 3 transmits to the terminal device 1 the higher layer signal that includes information indicating a CP length of the uplink signal in the serving cell. The terminal device 1 sets a parameter, UL-CyclicPrefix-Length, which indicates the CP length in the uplink in the serving cell, based on the higher layer signal that is received from the base station apparatus 3. That is, the base station apparatus 3 sets the parameter, UL-CyclicPrefixLength, which indicates the CP length in the uplink in the serving cell, for the terminal device 1 through the higher layer signal.

The base station apparatus 3 may transmit to the terminal device 1 the higher layer signal that includes information indicating a CP length for the D2D. The terminal device 1 may set a parameter, D2D-CyclicPrefixLength, which indicates the CP length for the D2D, based on the higher layer signal that is received from the base station apparatus 3. That is, the base station apparatus 3 may set the parameter, D2D-CyclicPrefixLength, which indicates the CP length for the D2D, for the terminal device 1 through the higher layer signal.

CP lengths of the PD2DSCH and the D2DSS, and a CP length of the PD2DDCH may be dedicatedly configured.

A CP length for each of the type 1 of D2D discovery, the type 2 of D2D discovery, the mode 1 for the D2D communication, and the mode 2 for the D2D communication may be dedicatedly configured.

A CP length of the PD2DDCH relating to the transmission of the D2D data, and a CP length of the PD2DDCH relating to the transmission of the D2DSA may be dedicatedly configured.

That is, the CP lengths of the PD2DSCH and the D2DSS may be defined in advance with specifications or the like, and may be fixed. The CP length of the PD2DDCH relating to the transmission of the D2DSA may be defined in advance with specifications or the like, and may be fixed.

A method of configuring a mode for the D2D communication will be described below.

The mode 2 for the D2D communication may be configured for the terminal device 1 out of the EUTRAN coverage. The mode 1 for the D2D communication does not have to be configured for the terminal device 1 out of the EUTRAN coverage.

When it comes to the terminal device 1 out of the EUTRAN coverage, the terminal device 1 may receive information designating the mode 1 for the D2D communication or the mode 2 for the D2D communication, from the base station apparatus 3 through the higher layer (RRC layer) signal. That is, based on information that is received from the base station apparatus 3, the terminal device 1 out of the EUTRAN coverage may configure the mode 1 for the D2D communication or the mode 2 for the D2D communication. Information designating the mode 1 for the D2D communication or the mode 2 for D2D communication is included in a message RRCConnectionReconfiguration, which is an RRC layer message.

Based on a handover command that is received from the base station apparatus 3, the terminal device 1 in the EUTRAN coverage may configure the mode for the D2D communication in a target cell. The handover command is the message RRCConnectionReconfiguration that includes mobilityControlInfo. mobilityControlInfo includes information relating to a frequency of the target cell, information relating to a cell identity of the target cell, and the like. The message RRCConnectionReconfiguration that includes mobilityControlInfo includes information indicating the mode for the D2D communication in the target cell, and a parameter in the RRC layer in the target cell.

Figure 5:
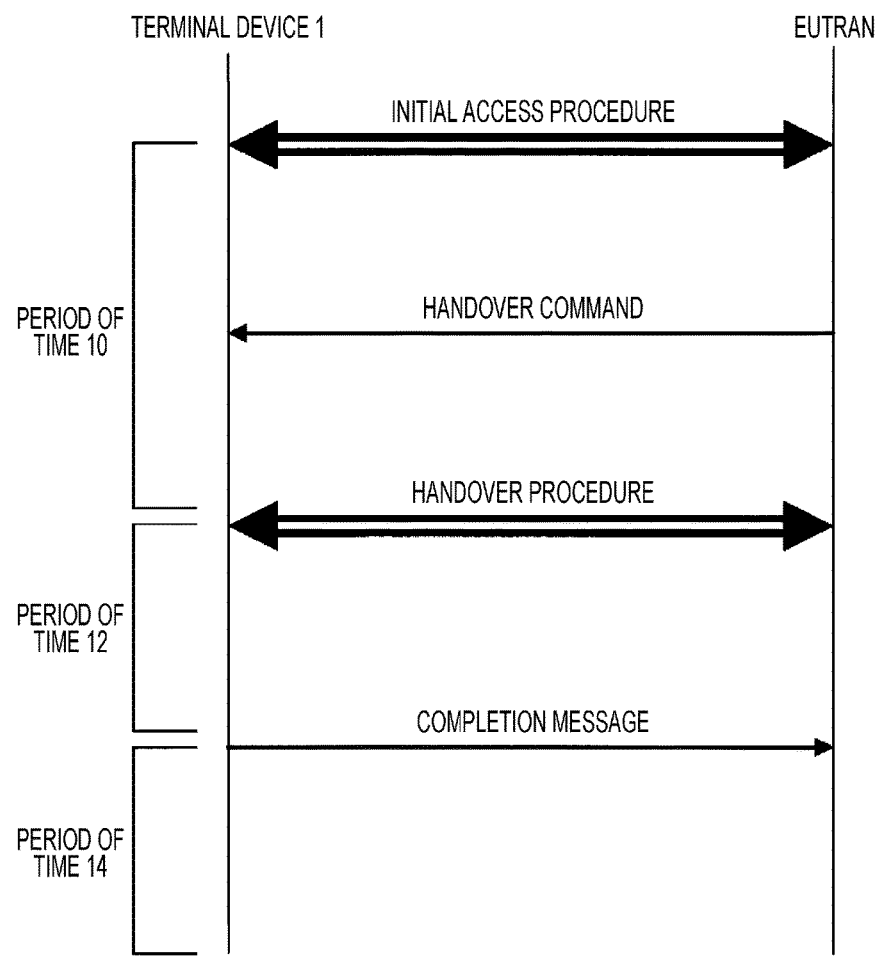
FIG. 5 is a diagram for describing a method of configuring a mode for D2D communication according to the present embodiment.
Figure 6:
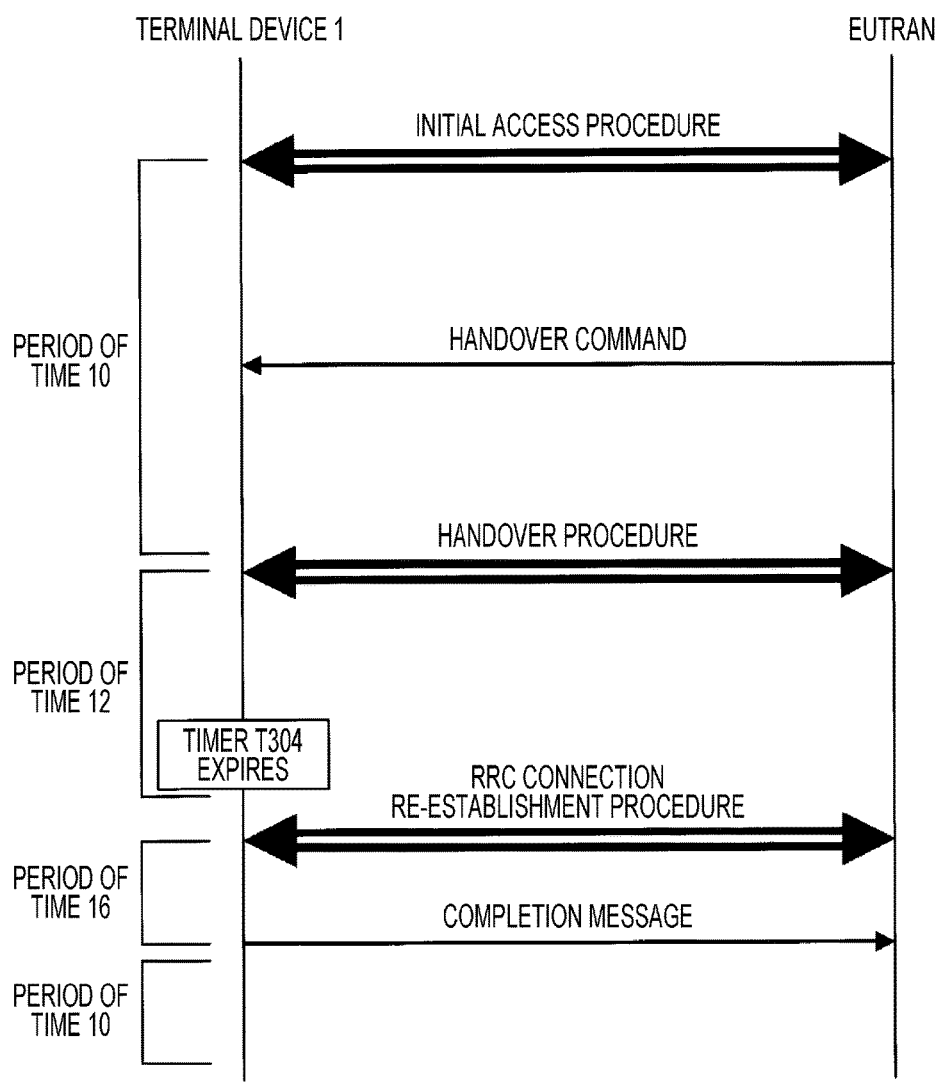
FIG. 6 is a diagram for describing the method of configuring the mode of the D2D communication according to the present embodiment.

FIGS. 5 and 6 are diagrams for describing the method of configuring the mode for the D2D communication according to the present embodiment. In FIG. 5, the terminal device 1 succeeds in handover. In FIG. 6, the terminal device 1 fails in handover.

A period of time 10 in FIGS. 5 and 6 is a period of time during which, in a source cell prior to handover, the terminal device 1 performs the D2D communication based on the mode that is configured for the D2D communication. During an initial access procedure or an RRC connection re-establishment procedure, the mode for the D2D communication may be configured for the terminal device 1 through the message RRCConnectionReconfiguration. The source cell may include a source primary cell. The source primary cell is a primary cell prior to execution of the handover procedure.

A period of time 12 in FIG. 5 is a period of time from when the handover procedure is started to when a message completion (RRCConnectionReconfigurationComplete) message is transmitted to the EUTRAN. The period of time 12 may be a period of time from when the handover procedure is started to when the information indicating the mode for the D2D communication in the target cell, which is included in the handover command, applies. The target cell may include a target primary cell. The target primary cell is a primary cell that is a handover target.

The period of time 12 in FIG. 6 is a period of time for which a T304 timer runs. In FIG. 5, the period of time 12 may also be a period of time for which the T304 timer runs. In a case where the message RRCConnectionReconfiguration that includes mobilityControlInfo is received, the terminal device 1 starts the T304 timer. A value of the T304 timer is set to a value that is indicated by information which is included in mobilityControlInfo. In a case where the terminal device 1 succeeds in handover, the terminal device 1 stops the T304 timer. For example, after the RRC layer outputs the message RRCConnectionReconfigurationComplete to a lower layer, in a case where the MAC completes a random access procedure successfully, the RRC layer of the terminal device 1 stops the T304 timer.

The period of time 12 in FIGS. 5 and 6, the terminal device 1 may perform one or multiple reception/monitoring processing operations, among the following reception/monitoring processing operations.

Processing (1): Reception/Monitoring Processing Based on the Configuration of the D2D Communication prior to Handover Processing (2): Reception/Monitoring Processing Based on the Configuration of the D2D Communication after handover processing (3): Reception/Monitoring Processing Based on the Configuration of the D2D Communication, which is Pre-configured Moreover, the terminal device 1 out of the EUTRAN coverage performs the D2D communication based on the configuration of the D2D communication that is pre-configured. The configurations of the D2D communication include configurations of a resource pool, a CP length, and the like for the D2D communication.

In the period of time 12 in FIGS. 5 and 6, the terminal device 1 may determine which processing (1) to processing (3) is performed, based on information (for example, the handover command) that is received from the EUTRAN. Based on the information that is received from the EUTRAN, in the period of time 12, the terminal device 1 may determine that none of processing (1) to processing (3) is performed.

During the period of time 12 in FIGS. 5 and 6, the terminal device 1 may perform one or multiple transmission processing operations, among the following transmission processing operations.

Processing (4): Transmission Processing Based on a Configuration of the mode 2 for the D2D Communication prior to Handover Processing (5): Transmission Processing Based on the Configuration of the mode 2 for the D2D Communication after Handover Processing (6): Transmission Processing of the Communication Signal Based on the Configuration of the D2D Communication, which is Pre-configured for the mode Processing (7): Transmission Processing of the Communication Processing Based on a Configuration of the mode 1 for the D2D Communication prior to Handover Processing (8): Transmission Processing of the Communication Processing Based on the Configuration of the mode 1 of the D2D Communication after Handover In the period of time 12 in FIGS. 5 and 6, the terminal device 1 may determine which processing (4) to processing (8) is performed, based on the information (for example, the handover command) that is received from the EUTRAN. Based on the information that is received from the EUTRAN, in the period of time 12, the terminal device 1 may determine that none of processing (4) to processing (8) is performed.

A period of time 14 in FIG. 5 is a period of time during which, in the target cell after handover, the terminal device 1 performs the D2D communication based on the mode that is configured for the D2D communication. For the terminal device 1, the mode for the D2D communication is configured through the handover command A period of time 16 in FIG. 6 is a period of time from when the terminal device 1 fails in handover to when the RRC connection re-establishment is completed.

In a case where the T304 timer expires, the terminal device 1 reverts back to the configuration that is used in the source cell and starts the RRC connection re-establishment procedure, except for a configuration of dedicated D2D. That is, in the case where the T304 timer expires, the terminal device 1 fails in handover. The configurations for the dedicated D2D include the configuration of the mode 1 for the D2D communication. The configuration (a configuration of the resource pool) of the mode 2 for the D2D communication may be included in the dedicated D2D. The configuration (the configuration of the resource pool) of the mode 2 for the D2D communication may be transmitted through a system information block that is common to multiple terminal devices 1.

The configuration of the dedicated D2D is based on information or a message that is dedicated to the terminal device 1. The system information block includes information or a message that is common to multiple terminal devices 1. The information or the message that is common to the multiple terminal devices 1 is information or a message that is shared among a cell.

The handover command may include the information or the message that is dedicated to the terminal device 1 and the information or the message that is common to the multiple terminal devices 1.

During the period of time 12 and/or a period of time 16, the terminal device 1 may determine which of processing (1) to processing (8) is performed, based on whether information indicating the configuration of the mode 2 for the D2D communication is the information or the message dedicated to terminal device 1 or is the information or the message that is common to the multiple terminal devices 1.

In an example 1, in a case where the information indicating the configuration of the mode 2 for the D2D communication is the information or the message that is common to the multiple terminal devices 1, during the period of time 12 in FIGS. 5 and 6, the terminal device 1 may perform processing (2) and/or processing (5).

In an example 2, in a case where the information indicating the configuration of the mode 2 for the D2D communication is the information or the message that is dedicated to the terminal devices 1, during the period of time 12 in FIGS. 5 and 6, the terminal device 1 may perform processing (3) and/or processing (6).

In an example 3, in the case where the information indicating the configuration of the mode 2 for the D2D communication is the information or the message that is dedicated to the terminal devices 1, during the period of time 12 in FIGS. 5 and 6, the terminal device 1 may not perform processing for the D2D communication.

In an example 4, during the period of time 12 in FIG. 5, in a case where the configuration of the D2D in the mode 2 in the target cell is transmitted through the system information block, the terminal device 1 that is in the middle of performing handover may perform both or one of processing (1) and processing (4).

In an example 5, during the period of time 12 in FIG. 5, in a case where the configuration of the D2D in the mode 2 in the target cell is transmitted through the information or the message dedicated to the terminal device 1, the terminal device 1 that is in the middle of performing handover may perform both or one of processing (3) and processing (6).

In an example 6, during the period of time 12 in FIG. 5, in the case where the configuration of the D2D in the mode 2 in the target cell is transmitted through the information or the message dedicated to the terminal device 1, the terminal device 1 that is in the middle of performing handover may not perform the processing for the D2D communication.

In an example 7, during the period of time 16 in FIG. 6, in a case where the configuration of the D2D in the mode 2 in the source cell is transmitted through the system information block, the terminal device 1 that fails in handover may perform both or one of processing (1) and processing (4).

In an example 8, during the period of time 16 in FIG. 6, in a case where the configuration of the D2D in the mode 2 in the source cell is transmitted through the information or the message dedicated to the terminal device 1, the terminal device 1 that fails in handover may perform both or one of processing (3) and processing (6).

In an example 9, during the period of time 16 in FIG. 6, in the case where the configuration of the D2D in the mode 2 in the source cell is transmitted through the information or the message dedicated to the terminal device 1, the terminal device 1 that fails in handover may not perform the processing for the D2D communication.

In the examples 1 to 9, which are described above, the terminal device 1 may be instructed to perform the D2D communication in the mode 1 in the source cell. In the examples 1 to 9, which are described above, the terminal device 1 may be instructed to perform the D2D communication in the mode 1 in the target cell. In the examples 1 to 9, which are described above, the terminal device 1 may be instructed to perform the D2D communication in the mode 2 in the source cell. In the examples 1 to 9, which are described above, the terminal device 1 may be instructed to perform the D2D communication in the mode 2 in the target cell.

During the period of time 12 and/or the period of time 16, based on whether or not the base station apparatus 3 provides an instruction that the D2D communication in any mode has to be performed, the terminal device 1 may determine which of processing (1) to processing (8) is performed. During the period of time 12 and/or the period of time 16, based on whether the base station apparatus 3 provides the instruction that the D2D communication in any mode has to be performed, the terminal device 1 may determine that none of processing (1) to processing (8) is performed.

During the period of time 12 and/or the period of time 16, based on the mode for the D2D communication that the terminal device 1 is instructed to perform in the source cell and the mode for the D2D communication that the terminal device 1 is instructed to perform in the target cell, the terminal device 1 may determine which of processing (1) to processing (8) is performed. During the period of time 12 and/or the period of time 16, based on the mode for the D2D communication that the terminal device 1 is instructed to perform in the source cell and the mode for the D2D communication that the terminal device 1 is instructed to perform in the target cell, the terminal device 1 may determine that none of processing (1) to processing (8) is performed.

A constitution of the device according to the present embodiment will be described below.

Figure 7:
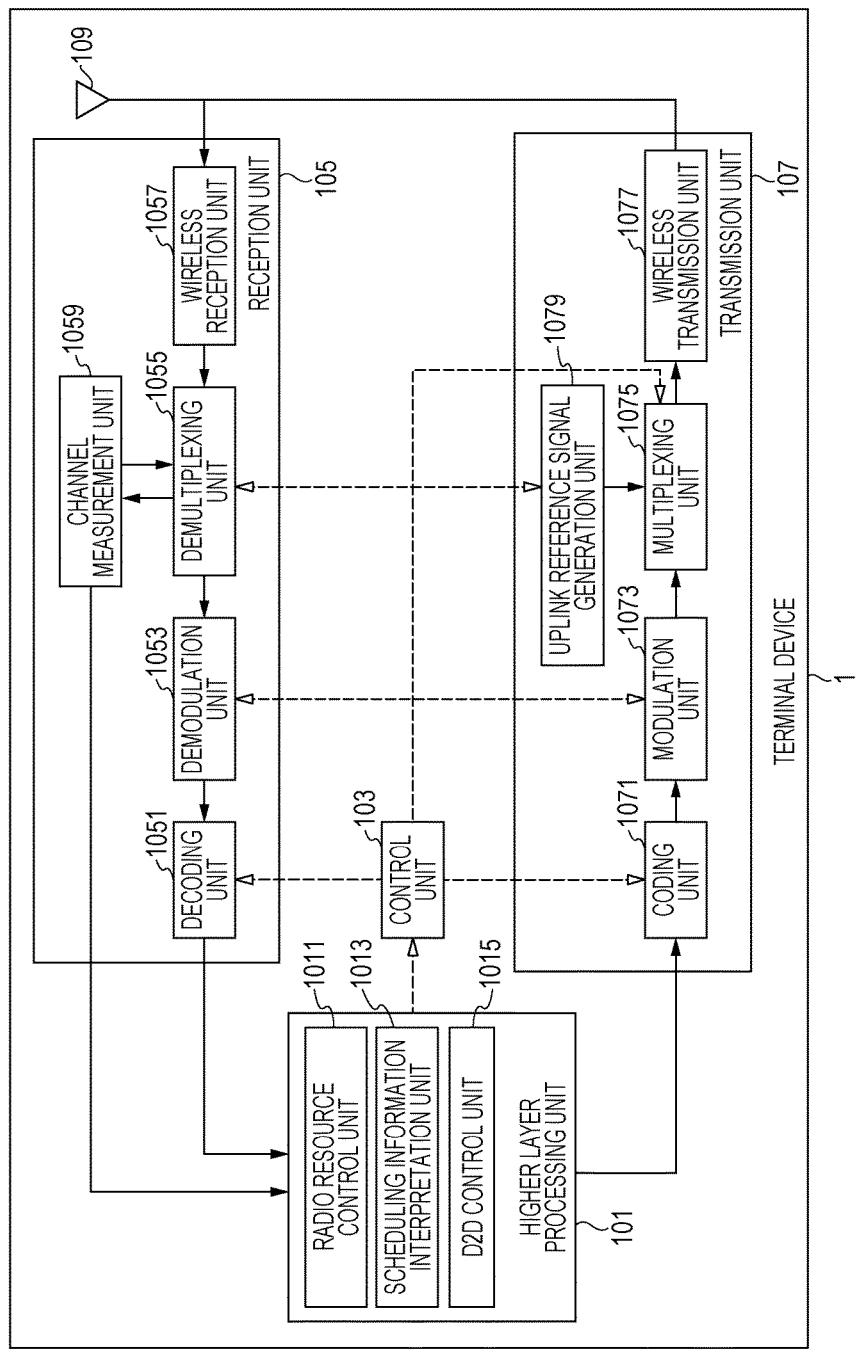
FIG. 7 is a schematic block diagram illustrating a constitution of a terminal device 1 according to the present embodiment.

FIG. 7 is a schematic block diagram illustrating a constitution of the terminal device 1 according to the present embodiment. As illustrated, the terminal device 1 is constituted to include a higher layer processing unit 101, a control unit 103, a reception unit 105, a transmission unit 107, and a transmit and receive antenna unit 109. Furthermore, the higher layer processing unit 101 is constituted to include a radio resource control unit 1011, a scheduling information interpretation unit 1013, and a D2D control unit 1015. Furthermore, the reception unit 105 is constituted to include a decoding unit 1051, a demodulation unit 1053, a demultiplexing unit 1055, a wireless reception unit 1057, and a channel measurement unit 1059. Furthermore, the transmission unit 107 is constituted to include a coding unit 1071, a modulation unit 1073, a multiplexing unit 1075, a wireless transmission unit 1077, and an uplink reference signal generation unit 1079.

The higher layer processing unit 101 outputs the uplink data (the transport block) that is generated by a user operation and the like, to the transmission unit 107. Furthermore, the higher layer processing unit 101 performs processing of a Medium Access Control (MAC) layer, a Packet Data Convergence Protocol (PDCP) layer, a Radio Link Control (RLC) layer, and a Radio Resource Control (RRC) layer.

The radio resource control unit 1011 that is included in the higher layer processing unit 101 manages various pieces of configuration information of the terminal device 1 itself or various parameters for the terminal device 1 itself. The radio resource control unit 1011 sets various pieces of configuration information/parameters based on the higher layer signal that is received from the base station apparatus 3. That is, the radio resource control unit 1011 sets various pieces of configuration information/parameters based on pieces of information indicating various pieces of configuration information/parameters that are received from the base station apparatus 3. Furthermore, the radio resource control unit 1011 generates information that is mapped to each channel in the uplink and outputs the generated information to the transmission unit 107.

The scheduling information interpretation unit 1013 that is included in the higher layer processing unit 101 interprets the DCI format (the scheduling information) that is received through the reception unit 105, generates control information for performing control of the reception unit 105 and the transmission unit 107 based on a result of interpreting the DCI format, and outputs the generated control information to the control unit 103.

The D2D control unit 1015 that is included in the higher layer processing unit 101 performs control of the D2D discovery, the D2D communication, and/or ProSe-assisted WLAN direct communication, based on various pieces of configuration information/parameters that are managed by the radio resource control unit 1011. The D2D control unit 1015 may generate information that is associated with the D2D, which is transmitted to a different terminal device 1 or the EUTRAN (the base station apparatus 3).

The control unit 103 generates a control signal for performing the control of the reception unit 105 and the transmission unit 107, based on control information from the higher layer processing unit 101. The control unit 103 outputs the generated control signal to the reception unit 105 and the transmission unit 107, and performs the control of the reception unit 105 and the transmission unit 107.

In accordance with the control signal that is input from the control unit 103, the reception unit 105 demultiplexes, demodulates, and decodes a reception signal that is received from the base station apparatus 3 through the transmit and receive antenna unit 109, and outputs information that results from the decoding, to the higher layer processing unit 101.

The wireless reception unit 1057 converts (down-converts) a downlink signal that is received through the transmit and receive antenna unit 109 into a signal in a baseband by performing orthogonal demodulation, removes a unnecessary frequency component, controls an amplification level in such a manner that a signal level is suitably maintained, performs orthogonal demodulation based on an in-phase component and an orthogonal component of the received signal, and converts the analog signal that results from the orthogonal demodulation, into a digital signal. The wireless reception unit 1057 removes a portion that is equivalent to a Cyclic Prefix (CP) from the digital signal that results from the conversion, performs Fast Fourier Transform (FFT) on the signal from which the CP is removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 performs compensation on channels, that is, the PHICH, the PDCCH, the EPDCCH, and the PDSCH, using a channel estimation value that is input from the channel measurement unit 1059. Furthermore, the demultiplexing unit 1055 outputs the downlink reference signal that results from the demultiplexing to the channel measurement unit 1059.

The demodulation unit 1053 multiplies the PHICH by a corresponding code for compositing, performs demodulation in compliance with a Binary Phase Shift Keying (BPSK) modulation scheme on the resulting composite signal, and outputs a result of the demodulation to the decoding unit 1051. The decoding unit 1051 decodes the PHICH that is destined for the terminal device 1 itself, and outputs the HARQ indicator that results from the decoding to the higher layer processing unit 101. The demodulation unit 1053 performs demodulation in compliance with a QPSK modulation scheme on the PDCCH and/or the EPDCCH, and outputs a result of the demodulation to the decoding unit 1051. The decoding unit 1051 makes an attempt to perform the decoding of the PDCCH and/or the EPDCCH, and, in a case where it succeeds in the decoding, outputs the Downlink Control Information that results from the decoding and an RNTI to which the Downlink Control Information corresponds, to the higher layer processing unit 101.

The demodulation unit 1053 performs the demodulation on the PDSCH in compliance with a modulation scheme that is notified with the downlink grant, such as Quadrature Phase Shift keying (QPSK), 16 Quadrature Amplitude Modulation (QAM), or 64 QAM, and outputs a result of the demodulation to the decoding unit 1051. The decoding unit 1051 performs decoding based on information relating to a coding rate that is notified with the Downlink Control Information, and outputs downlink data (a transport block) that results from the decoding, to the higher layer processing unit 101.

The channel measurement unit 1059 measures a downlink path loss or a channel state from the downlink reference signal that is input from the demultiplexing unit 1055, and outputs the measured path loss or the channel state to the higher layer processing unit 101. Furthermore, the channel measurement unit 1059 calculates a downlink channel estimation value from the downlink reference signal and outputs the calculated downlink channel estimation value to the demultiplexing unit 1055. The channel measurement unit 1059 performs channel measurement and/or interference measurement in order to calculate a CQI.

The transmission unit 107 generates the uplink reference signal in accordance with the control signal, which is input from the control unit 103, performs the coding and the modulation on the uplink data (the transport block), which is input from the higher layer processing unit 101, multiplexes the PUCCH, the PUSCH, and the generated uplink reference signal, and transmits a result of the multiplexing to the base station apparatus 3 through the transmit and receive antenna unit 109.

The coding unit 1071 performs the coding, such as convolutional coding and block coding, on the uplink control information that is input from the higher layer processing unit 101. Furthermore, the coding unit 1071 performs turbo coding, based on information that is used for the scheduling of the PUSCH.

The modulation unit 1073 performs the modulation on coded bits, which are input from the coding unit 1071, in compliance with a modulation scheme that is notified with the Downlink Control Information, such as BPSK, QPSK, 16 QAM, or 64 QAM, or in compliance with a modulation scheme that is prescribed in advance for every channel. Based on the information that is used for the scheduling of the PUSCH, the modulation unit 1073 determines the number of sequences of pieces of data that are spatially multiplexed, maps multiple pieces of uplink data that are transmitted on the same PUSCH, to multiple sequences, by using Multiple Input Multiple Output (MIMO) Spatial Multiplexing (SM), and performs precoding on the sequences.

The uplink reference signal generation unit 1079 generates a sequence that is acquired according to a rule (an expression) that is prescribed in advance, based on a physical layer cell identifier (which is also referred to as a physical layer cell identity (PCI), a Cell ID, or the like) for identifying the base station apparatus 3, a bandwidth to which the uplink reference signal is mapped, a cyclic shift that is notified with the uplink grant, a value of a parameter for generation of a DMRS sequence, and the like. In accordance with the control signal that is input from the control unit 103, the multiplexing unit 1075 re-maps modulation symbols of the PUSCH in parallel and then performs Discrete Fourier Transform (DFT) on the resulting modulation symbols. Furthermore, the multiplexing unit 1075 multiplexes PUCCH and PUSCH signals and the generated uplink reference signal for every transmit antenna port. More precisely, the multiplexing unit 1075 maps the PUCCH and PUSCH signals and the generated uplink reference signal to resource elements for every transmit antenna port.

The wireless transmission unit 1077 performs Inverse Fast Fourier Transform (IFFT) on a signal that results from the multiplexing, generates an SC-FDMA symbol, attaches a CP to the generated SC-FDMA symbol, generates a digital signal in a baseband, converts the digital signal in the baseband into an analog signal, removes a superfluous frequency component using a low pass filter, performs up-converting into a carrier frequency, performs power amplification, and outputs a final result to the transmit and receive antenna unit 109 for transmission.

Figure 8:
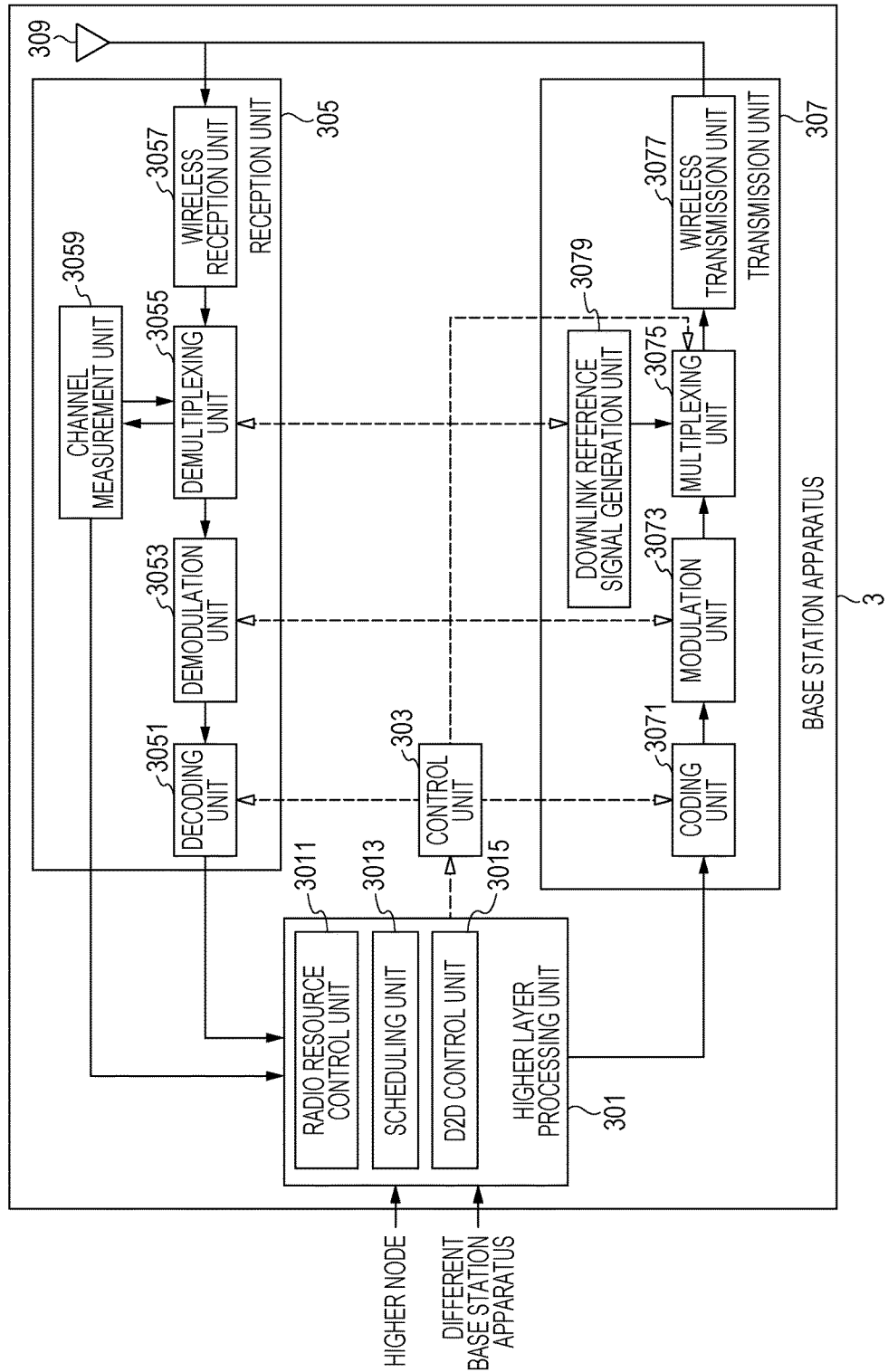
FIG. 8 is a schematic block diagram illustrating a constitution of a base station apparatus 3 according to the present embodiment.

FIG. 8 is a schematic block diagram illustrating a constitution of the base station apparatus 3 according to the present embodiment. As illustrated, the base station apparatus 3 is constituted to include a higher layer processing unit 301, a control unit 303, a reception unit 305, a transmission unit 307, and a transmit and receive antenna unit 309. Furthermore, the higher layer processing unit 301 is constituted to include a radio resource control unit 3011, a scheduling unit 3013, and a D2D control unit 3015. Furthermore, the reception unit 305 is constituted to include a decoding unit 3051, a demodulation unit 3053, a demultiplexing unit 3055, a wireless reception unit 3057, and a channel measurement unit 3059. Furthermore, the transmission unit 307 is constituted to include a coding unit 3071, a modulation unit 3073, a multiplexing unit 3075, a wireless transmission unit 3077, and a downlink reference signal generation unit 3079.

The higher layer processing unit 301 performs the processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates a control signal in order to perform control of the reception unit 305 and the transmission unit 307, and outputs the generated control information to the control unit 303.

The radio resource control unit 3011 that is included in the higher layer processing unit 301 generates, or acquires from a higher level node, the downlink data (the transport block) that is mapped to the PDSCH in the downlink, system information, the RRC message, a MAC Control Element (CE), and the like, and outputs a result of the generation or of the acquirement to the transmission unit 307. Furthermore, the radio resource control unit 3011 manages various pieces of configuration information of each of the terminal devices 1 or various parameters for each of the terminal devices 1. The radio resource control unit 1011 may set various pieces of configuration information/parameters for each of the terminal devices 1 through the higher layer signal. That is, the radio resource control unit 1011 transmits/broadcasts pieces of information indicating various pieces of configuration information/parameters.

The scheduling unit 3013 that is included in the higher layer processing unit 301 determines a frequency and a subframe to which the physical channel (the PDSCH and the PUSCH) is allocated, the coding rate and the modulation scheme for the physical channel (the PDSCH and the PUSCH), transmit power, and the like, from the received channel state information and from the channel estimation value, the channel quality, or the like that is input from the channel measurement unit 3059. The scheduling unit 3013 generates the control information (for example, the DCI format) in order to perform the control of the reception unit 305 and the transmission unit 307 based on a result of the scheduling, and outputs the generated information to the control unit 303. Furthermore, the scheduling unit 3013 determines a timing when the transmission processing and reception processing are performed.

The D2D control unit 3015 that is included in the higher layer processing unit 301 performs control of the D2D discovery, the D2D communication, and/or the ProSe-assisted WLAN direct communication in the terminal device 1 that performs the communication using the cellular link, based on various pieces of configuration information/parameters that are managed by the radio resource control unit 3011. The D2D control unit 3015 may generate the information that is associated with the D2D, which is transmitted to a different base station apparatus 3 or the terminal device 1.

The control unit 303 generates a control signal for performing the control of the reception unit 305 and the transmission unit 307, based on control information from the higher layer processing unit 301. The control unit 303 outputs the generated control signal to the reception unit 305 and the transmission unit 307 and performs the control of the reception unit 305 and the transmission unit 307.

In accordance with the control signal that is input from the control unit 303, the reception unit 305 demultiplexes, demodulates, and decodes a reception signal that is received from the terminal device 1 through the transmit and receive antenna unit 309, and outputs information that results from the decoding, to the higher layer processing unit 301. The wireless reception unit 3057 converts (down-converts) an uplink signal that is received through the transmit and receive antenna unit 309 into a signal in a baseband by performing the orthogonal demodulation, removes an unnecessary frequency component, controls an amplification level in such a manner that a signal level is suitably maintained, performs the orthogonal demodulation based on an in-phase component and an orthogonal component of the received signal, and converts the analog signal that results from the orthogonal demodulation, into a digital signal.

The wireless reception unit 3057 removes a portion that is equivalent to the Cyclic Prefix (CP), from the digital signal that results from the conversion. The wireless reception unit 3057 performs the Fast Fourier Transform (FFT) on the signal from which the CP is removed, extracts a signal in the frequency domain, and outputs the extracted signal to the demultiplexing unit 3055.

The demultiplexing unit 1055 demultiplexes the signal that is input from the wireless reception unit 3057, into the PUCCH, the PUSCH, the uplink reference signal, and the like. Moreover, the demultiplexing is performed based on radio resource allocation information that the base station apparatus 3 determines in advance, using the radio resource control unit 3011, and that is included in the uplink grant which is notified to each of the terminal devices 1. Furthermore, the demultiplexing unit 3055 performs the configuration on the channels, that is, the PUCCH and the PUSCH, using the channel estimation value that is input from the channel measurement unit 3059. Furthermore, the demultiplexing unit 3055 outputs the uplink reference signal that results from the demultiplexing, to the channel measurement unit 3059.

The demodulation unit 3053 performs Inverse Discrete Fourier Transform (IDFT) on the PUSCH, acquires a modulation symbol, and performs reception signal demodulation on each of the modulation symbols of the PUCCH and the PUSCH, using the modulation scheme that is prescribed in advance, such as Binary Phase Shift Keying (BPSK), QPSK, 16 QAM, or 64 QAM, or using the modulation scheme that the base station apparatus 3 itself notifies, in advance with the uplink grant, to each of the terminal devices 1. The demodulation unit 3053 demultiplexes the modulation symbols of the multiple pieces of uplink data that are transmitted on the same PUSCH by using the MIMO SM, based on the number of spatially multiplexed sequences that is notified in advance with the uplink grant to each of the terminal devices 1 and on information designating the precoding that is performed on the sequences.

The decoding unit 3051 performs the decoding on coded bits of the PUCCH and the PUSCH that result from the demodulation, at a coding rate in compliance with the coding scheme that is prescribed in advance, or at a coding rate which the base station apparatus 3 itself notifies, in advance with the uplink grant, to the terminal device 1, and outputs uplink data and uplink control information that result from the decoding, to the higher layer processing unit 101. In a case where the PUSCH is re-transmitted, the decoding unit 3051 performs the decoding using the coded bits that are input from the higher layer processing unit 301 and that are retained in a HARQ buffer, and the coded bits that results from the demodulation. The channel measurement unit 309 measures the channel estimation value, the channel quality, and the like, from the uplink reference signal that is input from the demultiplexing unit 3055, and outputs a result of the measurement to the demultiplexing unit 3055 and the higher layer processing unit 301.

The transmission unit 307 generates the downlink reference signal in accordance with the control signal that is input from the control unit 303, codes and modulates the HARQ indicator, the Downlink Control Information, and the downlink data that are input from the higher layer processing unit 301, multiplexes the PHICH, the PDCCH, the EPDCCH, the PDSCH, and the downlink reference signal, and transmits the resulting signal to the terminal device 1 through the transmit and receive antenna unit 309.

The coding unit 3071 performs the coding on the HARQ indicator, the Downlink Control Information, and the downlink data that are input from the higher layer processing unit 301, using the coding scheme that is prescribed in advance, such as the block coding, the convolutional coding, or the turbo coding, or using the coding scheme that is determined by the radio resource control unit 3011. The modulation unit 3073 performs the modulation on the coded bits that are input from the coding unit 3071, using the modulation scheme that is prescribed in advance, such as BPSK, QPSK, 16 QAM, or 64 QAM, or using the modulation scheme that is determined by the radio resource control unit 3011.

The downlink reference signal generation unit 3079 generates as the downlink reference signal a sequence that is already known to the terminal device 1 and that is acquired according to a rule that is prescribed in advance based on the physical layer cell identifier (PCI) for identifying the base station apparatus 3, and the like. The multiplexing unit 3075 multiplexes a modulation symbol of each channel, which results from the modulation, and the generated downlink reference signal. More precisely, the multiplexing unit 3075 maps a modulation symbol of each channel, which results from the modulation, and the generated downlink reference signal, to resource elements.

The wireless transmission unit 3077 performs the Inverse Fast Fourier Transform (IFFT) on a modulation symbol and the like that result from the multiplexing, generates an OFDM symbol, attaches a CP to the generated OFDM symbol, generates a digital signal in a baseband, converts the digital signal in the baseband into an analog signal, removes a superfluous frequency component using a low pass filter, performs up-converting into a carrier frequency, performs power amplification, and outputs a final result to the transmit and receive antenna unit 309 for transmission.

A terminal device 1 according to the present embodiment, which is a terminal device 1 that communicates with a different terminal device 1 and a base station apparatus 3 (the EUTRAN), includes a reception unit 105 that receives information indicating a length of a cyclic prefix for a D2D signal that is to be transmitted to the different terminal device 1, and information indicating a length of a cyclic prefix for an uplink signal that is to be transmitted to the base station apparatus 3, from the base station apparatus 3.

A terminal device 1 according to the present embodiment, includes a transmission unit 107 that, in a case where the uplink signal that is to be transmitted to the base station apparatus 3, and the D2D signal that is to be transmitted to the different terminal device 1 occur in the same cell at the same time, determines whether both of the uplink signal that is to be transmitted to the base station apparatus 3 and the D2D signal that is to be transmitted to the different terminal device 1 are transmitted, or any one of the uplink signal that is to be transmitted to the base station apparatus 3 and the D2D signal that is to be transmitted to the different terminal device 1 is transmitted, based at least on whether or not a transmission timing of the uplink signal that is to be transmitted to the base station apparatus 3 and a transmission timing of the D2D signal that is to be transmitted to the different terminal device 1 are the same, and/or on whether or not the length of the cyclic prefix for the uplink signal that is to be transmitted to the base station apparatus 3, and the length of the cyclic prefix of the D2D signal that is to be transmitted to the different terminal device 1 are the same.

The higher layer processing unit 101 (a configuration unit) performs configuration of a mode for D2D communication. For example, the higher layer processing unit 101 configures the mode for the D2D communication, based on an instruction from the base station apparatus 3, a T304 timer or the like.

The terminal device 1, which is a terminal device that communicates a different terminal device 1 and an Evolved Universal Terrestrial Radio Access Network (EUTRAN), includes the higher layer processing unit 101 (the configuration unit) that configures a mode 2 which is available for communication between terminal devices out of EUTRAN coverage and between terminal devices in the EUTRAN coverage, as a mode for communication between terminal devices, and that configures a first configuration (a configuration that is pre-configured) that is at least used for the communication between the terminal devices in the mode 2 out of the EUTRAN coverage, and configures a second configuration (a configuration other than the configuration that is pre-configured) that is used for the communication between the terminal devices in the mode 2 in the EUTRAN coverage, and a reception unit 105 that performs reception processing for the communication between the terminal devices in the mode 2.

The reception unit 105 may perform the reception processing for the communication between the terminal devices in the mode 2, based on the first configuration, during a handover procedure.

The reception unit 105 may perform the reception processing for the communication between the terminal devices in the mode 2, based on the second configuration for a resource pool, during the handover procedure.

The reception unit 105 may perform the reception processing for the communication between the terminal devices in the mode 2, based on the second configuration for a target cell, during the handover procedure.

The transmission unit 107 may perform transmission processing for the communication between the terminal devices in the mode 2, based on the first configuration, during the handover procedure.

The transmission unit 107 may perform the transmission processing for the communication between the terminal devices in the mode 2, based on the second configuration for the resource pool.

The transmission unit 107 may perform the transmission processing for the communication between the terminal devices in the mode 2, based on the second configuration for a target cell, during the handover procedure.

The transmission unit 107 may not perform the transmission processing for the communication between the terminal devices in the mode 2, during the handover procedure.

Accordingly, the D2D can be efficiently performed between the terminal devices 1. Furthermore, the base station apparatus 3 can efficiently control the D2D between the terminal devices 1 using the cellular link.

A program running on the base station apparatus 3 and the terminal device 1 according to the present invention may be a program (a program for causing a computer to operate) that controls a Central Processing Unit (CPU) and the like in such a manner as to realize the functions according to the embodiments of the present invention, which are described above. Then, pieces of information that are handled in these devices temporarily accumulate in a Random Access Memory (RAM) while being processed. Thereafter, the pieces of information are stored in various types of ROMs such as a Flash Read Only Memory (ROM), or a Hard Disk Drive (HDD), and if need arises, are read by the CPU to be modified or written.

Moreover, one portion of each of the terminal device 1 and the base station apparatus 3 according to the embodiments, which are described above, may be realized by the computer. In such a case, the portion may be realized by recording a program for realizing such a control function on a computer-readable medium and causing a computer system to read the program recorded on the recording medium for execution.

Moreover, the "computer system" here is defined as a computer system that is built into the terminal device 1 or the base station apparatus 3 and as including an OS or hardware components such as a peripheral device. Furthermore, the "computer-readable recording medium" refers to a portable medium, such as a flexible disk, a magnetooptical disk, a ROM, and a CD-ROM, and a storage device, such as a hard disk, that is built into the computer system.

Moreover, the "computer-readable recording media" may include a medium that dynamically retains the program for a short period of time, such as a communication line that is available when transmitting the program over a network such as the Internet or over a communication network such as a telephone network, and a medium that retains the program for a fixed period of time, such as a volatile memory within the computer system, which functions as a server or a client in a case where the program is retained dynamically for a short period of time. Furthermore, the program may be one for realizing some of the functions described above and may be one that can realize the functions described above in combination with a program that is already recorded on the computer system.

Furthermore, the base station apparatus 3 according to the embodiment, which is described above, can be realized as an aggregation (an apparatus group) that is constituted from multiple apparatuses. Each of the apparatuses that constitute the apparatus group may be equipped with some portions or all portions of each function of, or some portions or all portions of each functional block of the base station apparatus 3 according to the embodiment, which is described. The apparatus group itself may have each general function of or each general functional block of the base station apparatus 3. Furthermore, it is also possible that the terminal device 1 according to the embodiments, which is described, communicates with the base station apparatuses as an aggregation.

Furthermore, the base station apparatus 3 according to the embodiment, which is described, may be the Evolved Universal Terrestrial Radio Access Network (EUTRAN). Furthermore, the base station apparatus 3 according to the embodiment, which is described above, may have some portions or all portions of a function of a node that is at a higher level than an eNodeB.

Furthermore, some portions or all portions of each of the terminal device 1 and the base station apparatus 3 according to the embodiment, which are described above, may be realized as an LSI that is a typical integrated circuit and may be realized as a chip set. Each functional block of each of the terminal device 1 and the base station apparatus 3 may be individually realized into a chip, and some or all of the functional blocks may be integrated into a chip. Furthermore, a circuit integration technique is not limited to the LSI, and an integrated circuit for the functional block may be realized as a dedicated circuit or a general-purpose processor. Furthermore, if with advances in semiconductor technology, a circuit integration technology for a circuit with which an LSI is replaced will appear, it is also possible that an integrated circuit to which such a technology applies is used.

Furthermore, according to the embodiments, which are described above, the terminal device is described as one example of a communication device, but the present invention is not limited to this, and can also be applied to a terminal device or a communication apparatus, such as a fixed-type electronic apparatus that is installed indoors or outdoors, or a stationary-type electronic apparatus, for example, an AV apparatus, a kitchen apparatus, a cleaning or washing machine, an air conditioner, office equipment, a vending machine, and other household apparatuses.

The embodiments of the invention are described in detail above referring to the drawings, but the specific constitution is not limited to the embodiments and also includes an amendment to a design and the like that fall within the scope that does not depart from the gist of the present invention. Furthermore, various modifications are possible within the scope of the present invention defined by claims, and embodiments that are implemented by suitably combining technical means that are disclosed according to different embodiments also fall within the technical scope of the present invention. Furthermore, a constitution in which a constituent element that achieves the same effect is substituted for the one that is described above according to each embodiment described above also falls within the technical scope of the present invention.

INDUSTRIAL APPLICABILITY

Application of the present invention is possible in the fields of a communication apparatus including a terminal device and a base station apparatus, and of other electronic apparatuses.

DESCRIPTION OF REFERENCE NUMERALS 1 (1A, 1B, 1C) TERMINAL DEVICE
3 BASE STATION APPARATUS
101 HIGHER LAYER PROCESSING UNIT
103 CONTROL UNIT
105 RECEPTION UNIT
107 TRANSMISSION UNIT
109 TRANSMIT AND RECEIVE ANTENNA UNIT
301 HIGHER LAYER PROCESSING UNIT
303 CONTROL UNIT
305 RECEPTION UNIT
307 TRANSMISSION UNIT
309 TRANSMIT AND RECEIVE ANTENNA UNIT
1011 RADIO RESOURCE CONTROL UNIT
1013 SCHEDULING INFORMATION Interpretation UNIT
1015 D2D CONTROL UNIT
3011 RADIO RESOURCE CONTROL UNIT
3013 SCHEDULING UNIT
3015 D2D CONTROL UNIT

The invention claimed is:
1. A terminal device comprising:
transmission circuitry that performs transmission in a first communication in which a plurality of terminal devices communicate with each other directly; and
reception circuitry that receives a handover command from a network, the handover command indicating a mode for resource allocation in the first communication, and a first transmission resource for the first communication being scheduled by the network in the mode, wherein
the transmission circuitry transmits a communication signal by using the first transmission resource in the mode,
the transmission circuitry selects a second transmission resource from a first resource pool for the first communication, and transmits the communication signal by using the second transmission resource, while a timer is running until the timer expired in case of a handover failure or the timer stopped in case of a handover successful completion, the timer being started based on reception of the handover command,
the first resource pool is allocated by the network and includes a set of transmission resources including the second transmission resource,
each of the first and second transmission resources includes a plurality of resource elements, each of the plurality of resource elements is identified by a combination of a subcarrier number and either an orthogonal frequency-division multiplexing (OFDM) symbol number or a single carrier frequency-division multiple access (SC-FDMA) symbol number, the terminal device initiates a connection re-establishment procedure in a case of an expiration of the timer, and during the connection re-establishment procedure, the transmission circuitry further performs transmission for the first communication by using a second resource pool indicated by system information received from the network.

2. A communication method for a terminal device, comprising:

performing transmission in a first communication in which a plurality of terminal devices communicate with each other directly;

receiving a handover command from a network, the handover command indicating a mode for resource allocation in the first communication, first transmission resources for the first communication being scheduled by the network in the mode;

transmitting a communication signal by using the first transmission resource in the mode; and selecting a second transmission resource from a first resource pool for the first communication, and transmitting the communication signal by using the second transmission resource, while a timer is running until the timer expired in case of a handover failure or the timer stopped in case of a handover successful completion, the timer being started based on reception of the handover command, the first resource pool is allocated by the network and includes a set of transmission resources including the second transmission resource, each of the first and second transmission resources includes a plurality of resource elements, each of the plurality of resource elements is identified by a combination of a subcarrier number and either an orthogonal frequency-division multiplexing (OFDM) symbol number or a single carrier frequency-division multiple access (SC-FDMA) symbol number, and during the connection re-establishment procedure, performing transmission for the first communication by using a second resource pool indicated by system information received from the network, wherein the connection re-establishment procedure is initiated in a case of an expiration of the timer.

* * * * *